(12) United States Patent
Hirai

(10) Patent No.: US 11,310,386 B2
(45) Date of Patent: Apr. 19, 2022

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventor: Kazunari Hirai, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/933,970

(22) Filed: Jul. 20, 2020

(65) Prior Publication Data

US 2021/0243325 A1 Aug. 5, 2021

(30) Foreign Application Priority Data

Feb. 5, 2020 (JP) .............................. JP2020-018326

(51) Int. Cl.
*H04N 1/00* (2006.01)
*H04N 1/21* (2006.01)

(52) U.S. Cl.
CPC ........... *H04N 1/00954* (2013.01); *H04N 1/21* (2013.01)

(58) Field of Classification Search
None
See application file for complete search history.

(56) References Cited

U.S. PATENT DOCUMENTS

| 8,099,384 | B2 | 1/2012 | Miyazawa et al. |
| 8,681,358 | B2 | 3/2014 | Masuda |
| 8,812,403 | B2* | 8/2014 | Mercuri ............... G06Q 10/103 705/301 |
| 2004/0190057 | A1* | 9/2004 | Takahashi ............ G06F 3/1275 358/1.15 |
| 2010/0185477 | A1* | 7/2010 | Soga ..................... G06Q 10/06 705/7.27 |

(Continued)

FOREIGN PATENT DOCUMENTS

| JP | 2009224958 | 10/2009 | |
| JP | 2011259337 | 12/2011 | |
| JP | 2012164207 | * 8/2012 | ............. G06Q 10/06 |

OTHER PUBLICATIONS

K. R. Lang and M. Schmidt, "Workflow-supported organizational memory systems: an industrial application," Proceedings of the 35th Annual Hawaii International Conference on System Sciences, 2002, pp. 2549-2557, doi: 10.1109/HICSS.2002.994225. (Year: 2002).*

(Continued)

*Primary Examiner* — Beniyam Menberu
(74) *Attorney, Agent, or Firm* — JCIPRNET

(57) ABSTRACT

An information processing apparatus includes a memory that stores each of a plurality of documents, and a processor, in which the processor is configured to receive, from a manager who manages a first step of outputting a first document and a manager who manages a second step of inputting a second document which has content common to the first document and is stored later than the first document among the plurality of documents, first instructions as to whether or not to permit first processing of inputting a document, which is output from the first step, to the second step, and perform the first processing in a case where both the received first instructions permit the first processing.

9 Claims, 14 Drawing Sheets

(56) References Cited

U.S. PATENT DOCUMENTS

2019/0052840 A1* 2/2019 Taylor ................. G06F 3/1446

OTHER PUBLICATIONS

T. C. Chieu, T. Nguyen and K. Roy, "Document access in a multi-party information management system," 2008 IEEE International Conference on Service Operations and Logistics, and Informatics, 2008, pp. 806-811, doi: 10.1109/SOLI.2008.4686509. (Year: 2008).*

* cited by examiner

| USER ID | USER NAME | ORGANIZATION ID | DEPARTMENT NAME | CONTACT ADDRESS |
|---|---|---|---|---|
| U1 | ... | Ga | DESIGN DEPARTMENT | ... |
| U2 | ... | Ga | DESIGN DEPARTMENT | ... |
| U3 | ... | Ga | PURCHASING DEPARTMENT | ... |
| ... | ... | ... | ... | ... |
| U4 | ... | Gb | CONTRACT DEPARTMENT | ... |
| U5 | ... | Gb | CONTRACT DEPARTMENT | ... |
| ... | ... | ... | ... | ... |

FIG. 5A

| W21 | | | | 1223 |
|---|---|---|---|---|
| STEP NUMBER | PROCESSING NAME | MANAGER ID | INPUT FOLDER | OUTPUT FOLDER |
| 1 | PREPARATION OF APPLICATION FORM | U1 | F1 | F2 |
| 2 | CONVERSION | - | F2 | F3 |
| 3 | INSPECTION | U2 | F3 | F4 |
| 4 | PREPARATION OF ORDER SHEET | U3 | F4 | F5 |

FIG. 5B

| W31 | | | | 1223 |
|---|---|---|---|---|
| STEP NUMBER | PROCESSING NAME | MANAGER ID | INPUT FOLDER | OUTPUT FOLDER |
| 1 | CHECK OF ORDER SHEET | U4 | F11 | F12 |
| 2 | INSPECTION | U5 | F12 | F13 |
| 3 | PREPARATION OF DELIVERY NOTE | U4 | F13 | F14 |

| DOCUMENT ID | DATE AND TIME | FOLDER | DOCUMENT NAME | DOCUMENT DATA | HASH VALUE |
|---|---|---|---|---|---|
| D4 | T4 | F5 | ... | ... | H3 |
| D5 | T5 | F11 | ... | D4 | - |
| D6 | T6 | ... | ... | ... | H4 |

FIG. 14

| W41 | | | | 1223 |
|---|---|---|---|---|
| STEP NUMBER | PROCESSING NAME | MANAGER ID | INPUT FOLDER | OUTPUT FOLDER |
| 1 | PREPARATION OF APPLICATION FORM | U11 | F21 | F22 |
| 2 | CONVERSION | - | F22 | F23 |
| 3 | INSPECTION | U12 | F23 | F24 |
| 4 | PREPARATION OF ORDER SHEET | U13 | F24 | F25 |

FIG. 15

| OUTPUT-SIDE STEP ID | INPUT-SIDE STEP ID | INSTRUCTION CONTENT |
|---|---|---|
| ... | ... | PERMISSION WITHIN TIME LIMIT |
| W21-4 | W31-1 | PERMISSION WITHOUT TIME LIMIT |
| W41-4 | W31-1 | PERMISSION WITHIN TIME LIMIT |
| ... | ... | DISAPPROVAL |

FIG. 16

| DOCUMENT ID | DATE AND TIME | FOLDER | DOCUMENT NAME | DOCUMENT DATA | HASH VALUE |
|---|---|---|---|---|---|
| D7 | T7 | F25 | ... | ... | H5 |
| D8 | T8 | F11 | ... | D7 | - |
| D9 | T9 | ... | ... | ... | H6 |

FIG. 18

| W42 | | | | 1223 |
|---|---|---|---|---|
| STEP NUMBER | PROCESSING NAME | MANAGER ID | INPUT FOLDER | OUTPUT FOLDER |
| 1 | CHECK ORDER SHEET | U24 | F31 | F32 |
| 2 | INSPECTION | U25 | F32 | F33 |
| 3 | PREPARATION OF DELIVERY NOTE | U24 | F33 | F34 |

FIG. 19

| DOCUMENT ID | DATE AND TIME | FOLDER | DOCUMENT NAME | DOCUMENT DATA | HASH VALUE |
|---|---|---|---|---|---|
| D10 | T10 | F5 | ... | ... | H7 |
| D11 | T11 | F31 | ... | D10 | - |
| D12 | T12 | ... | ... | ... | H8 |

124

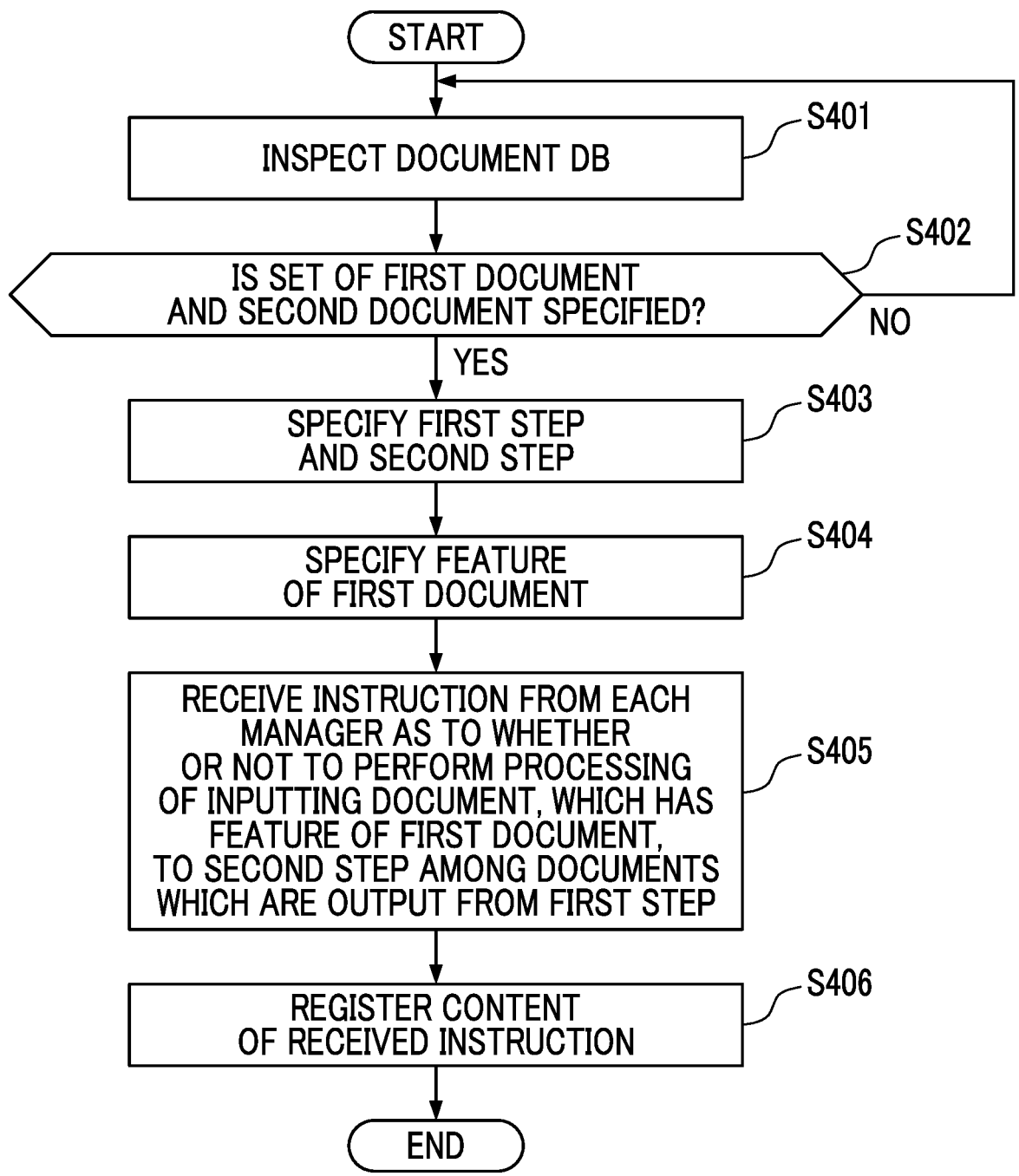

though the manual work occurs in a case where the workflow system is actually started to be applied, a manager who manages the step is difficult to notice and define the manual work.

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2020-018326 filed Feb. 5, 2020.

BACKGROUND

(i) Technical Field

The present invention relates to an information processing apparatus and a non-transitory computer readable medium storing a program.

(ii) Related Art

Various workflow systems are developed for a purpose of improving efficiency of routine tasks. The workflow system is a system that defines and standardizes a flow of a frequently performed task, and assists a work of each person in the task in incorporation with a computer.

In a case where a plurality of systems are engaged to advance the task, there is a case where efficiency increases in a case where the systems are interworked with each other. For example, JP2011-259337A is provided as a technique for interworking a system that distributes image data with a system to which the image data is distributed.

SUMMARY

By the way, in a workflow system, there is a case where even a step which is always input and output according to a fixed procedure is continuously performed through a manual work. Although the manual work occurs in a case where the workflow system is actually started to be applied, a manager who manages the step is difficult to notice and define the manual work.

Aspects of non-limiting embodiments of the present disclosure relate to an information processing apparatus and a non-transitory computer readable medium storing a program that eliminate the manual work for interworking the workflow in a case where a document that is input and output to a plurality of steps in a determined order in the workflow.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus includes a memory that stores each of a plurality of documents, and a processor, in which the processor is configured to receive, from a manager who manages a first step of outputting a first document and a manager who manages a second step of inputting a second document which has content common to the first document and is stored later than the first document among the plurality of documents, first instructions as to whether or not to permit first processing of inputting a document, which is output from the first step, to the second step, and perform the first processing in a case where both the received first instructions permit the first processing.

BRIEF DESCRIPTION OF THE DRAWINGS

Exemplary embodiment(s) of the present invention will be described in detail based on the following figures, wherein:

FIGS. 5A and 5B are diagrams showing examples of a step table 1223;

FIG. 14 is a diagram showing an example of a workflow DB 122 according to the modification example;

FIG. 15 is a diagram showing an example of an instruction DB 123 according to the modification example;

FIG. 16 is a diagram showing an example of a result of permitted second processing;

FIG. 18 is a diagram showing an example of a workflow DB 122 according to the modification example;

FIG. 19 is a diagram showing an example of a result of a permitted third process; and FIG. 20 is a flowchart showing an example of the flow of the operation of registering the content of the instruction according to the modification example.

DETAILED DESCRIPTION

Exemplary Embodiment

Configuration of Information Processing System

Figure 1:
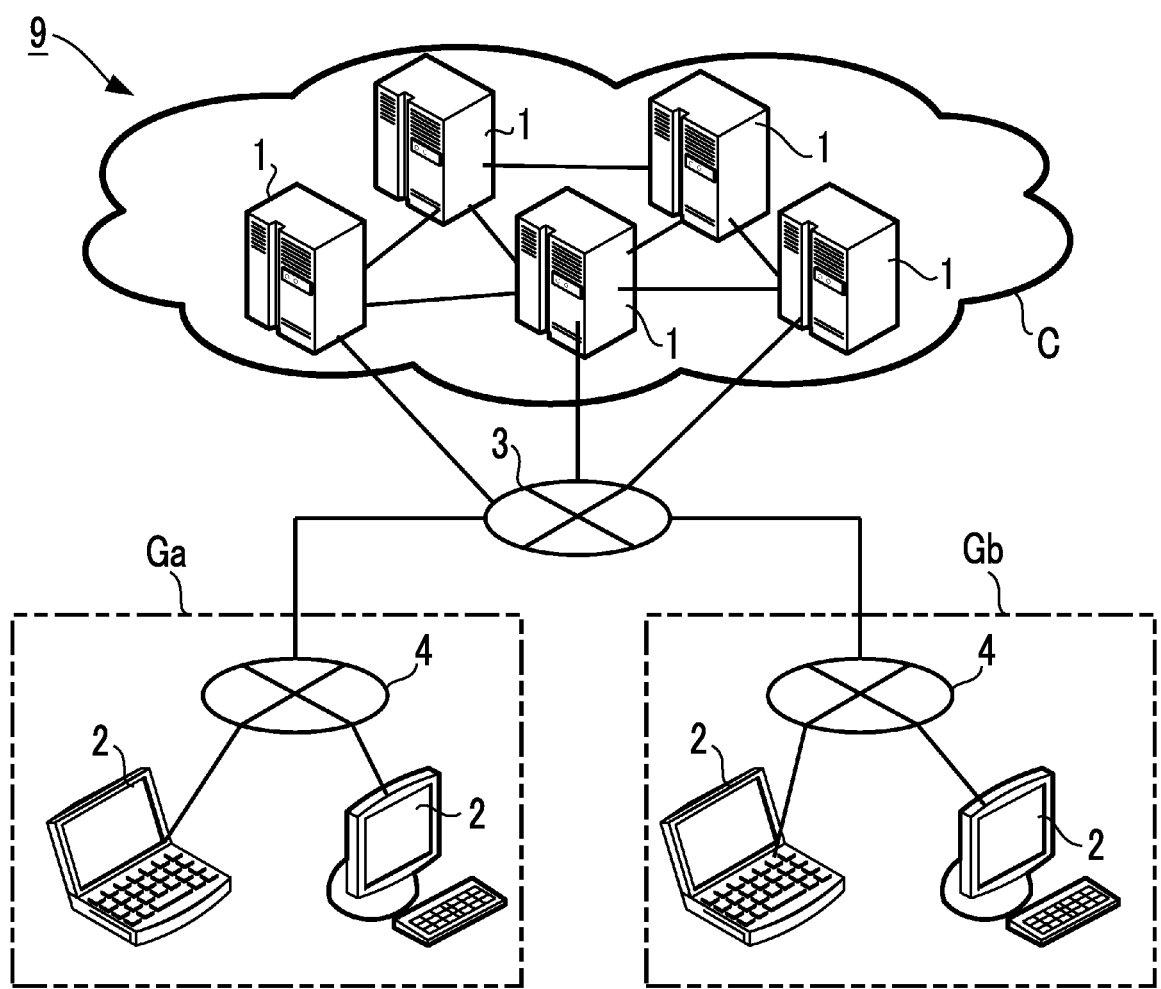
FIG. 1 is a diagram showing an example of an overall configuration of an information processing system 9.

FIG. 1 is a diagram showing an example of an overall configuration of an information processing system 9. The information processing system 9 is a system that manages a workflow indicating a flow of a routine task in an organization such as a company, and performs processing for advancing each step included in the workflow. The information processing system 9 includes an information processing apparatus 1, a terminal 2, a first communication line 3, and a second communication line 4 as shown in FIG. 1.

The terminal 2 is a terminal owned by each user of the information processing system 9, and includes, for example, a smartphone, a personal computer, or the like. The information processing system 9 shown in FIG. 1 includes a plurality of terminals 2.

The information processing apparatus 1 is an information processing apparatus that provides a workflow system to the terminal 2. The information processing apparatus 1 is, for example, a computer, and is a server apparatus that responds to a request from the terminal 2 that is a client apparatus. A plurality of information processing apparatuses 1 shown in FIG. 1 exists, and the plurality of information processing apparatuses 1 cooperate to configure a cloud C that provides a function to the terminal 2.

The first communication line 3 is a line that connects the information processing apparatus 1 to the second communication line 4 to be communicable. The first communication line 3 may be, for example, a Wide Area Network (WAN), the Internet, or a combination of the WAN and the Internet. In addition, the first communication line 3 may include a Public Switched Communication Network (PSTN) or an Integrated Services Digital Network (ISDN).

The second communication line 4 is a line that connects the first communication line 3 to the plurality of terminals 2 to be communicable with each other. The second communication line 4 shown in FIG. 1 is, for example, a Local Area Network (LAN) that connects the terminals 2 used in each organization to each other. In FIG. 1, the terminal 2 belonging to an organization Ga and the terminal 2 belonging to an organization Gb are connected to the first communication line 3 via the respective second communication lines 4.

Note that, each of the number of information processing apparatuses 1, the number of terminals 2, the number of first communication lines 3, and the number of second communication lines 4 in the information processing system 9 is not limited to each of the numbers shown in FIG. 1 and may be one or may be plural. In a case where the information processing system 9 includes only one information processing apparatus 1, the information processing apparatus 1 may not configure the above-described cloud C.

Configuration of Information Processing Apparatus

Figures 2, 3:
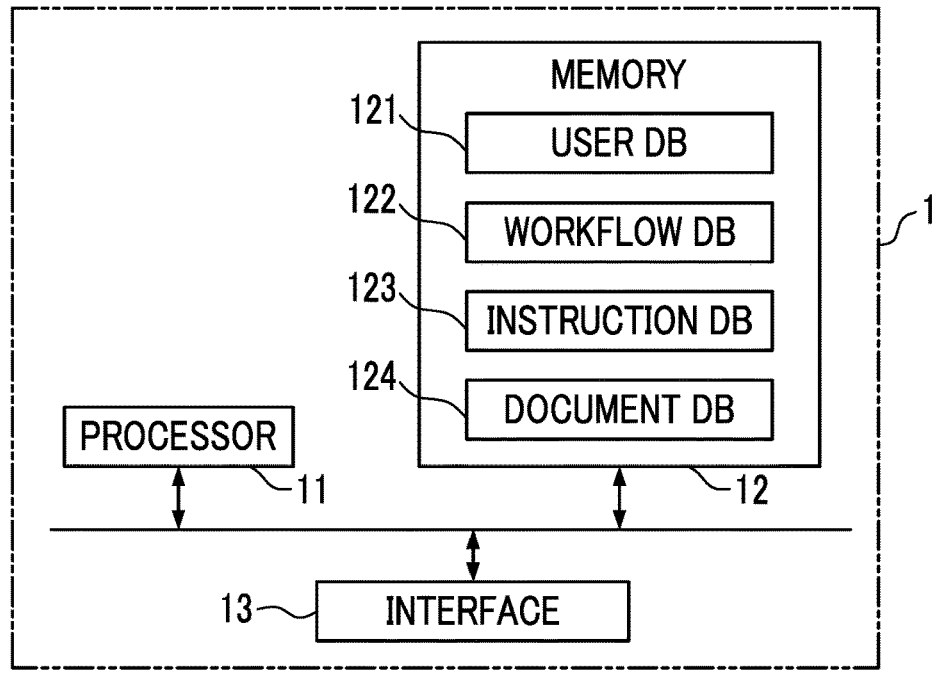
FIG. 2 is a diagram showing an example of a configuration of an information processing apparatus 1.
FIG. 3 is a diagram showing an example of a user DB 121.

FIG. 2 is a diagram showing an example of a configuration of the information processing apparatus 1. The information processing apparatus 1 shown in FIG. 2 includes a processor 11, a memory 12, and an interface 13. The components are connected by, for example, a bus to be communicable with each other.

The processor 11 controls each unit of the information processing apparatus 1 by reading and executing a computer program stored in the memory 12 (hereinafter, simply referred to as a program). The processor 11 is, for example, a Central Processing Unit (CPU).

The interface 13 is a communication circuit that connects the information processing apparatus 1 to the terminal 2 to be communicable via the first communication line 3 and the second communication line 4 in a wired or wireless manner. In the information processing system 9 shown in FIG. 1, the plurality of information processing apparatuses 1 configure the cloud C. In this case, the interface 13 is a communication circuit that enables communication with another information processing apparatus 1.

The memory 12 is a storage unit that stores an operating system, various programs, data, and the like which are read by the processor 11. The memory 12 includes a Random Access Memory (RAM) and a Read Only Memory (ROM). Note that, the memory 12 may include a solid state drive, a hard disk drive, or the like.

In addition, the memory 12 also stores a user DB 121, a workflow DB 122, an instruction DB 123, and a document DB 124. Note that, each of the plurality of information processing apparatuses 1 configuring the cloud C shown in FIG. 1 does not need to store all of the user DB 121, the workflow DB 122, the instruction DB 123, and the document DB 124 in the memory 12, and may cooperate with each other to be capable of using the user DB 121, the workflow DB 122, the instruction DB 123, and the document DB 124 which are stored in the memory 12 of any of the information processing apparatuses 1.

Configuration of User DB

FIG. 3 is a diagram showing an example of the user DB 121. The user DB 121 is a database that stores information on a user for each user ID that is identification information used to identify the user. In the user DB 121 shown in FIG. 3, the information on the user includes a user name that is a name of the user, an organization ID that is identification information on an organization to which the user belongs, and a name of a department to which the user belongs, and a contact address, such as a mail address, of the user.

Configuration of Workflow DB

Figure 4:
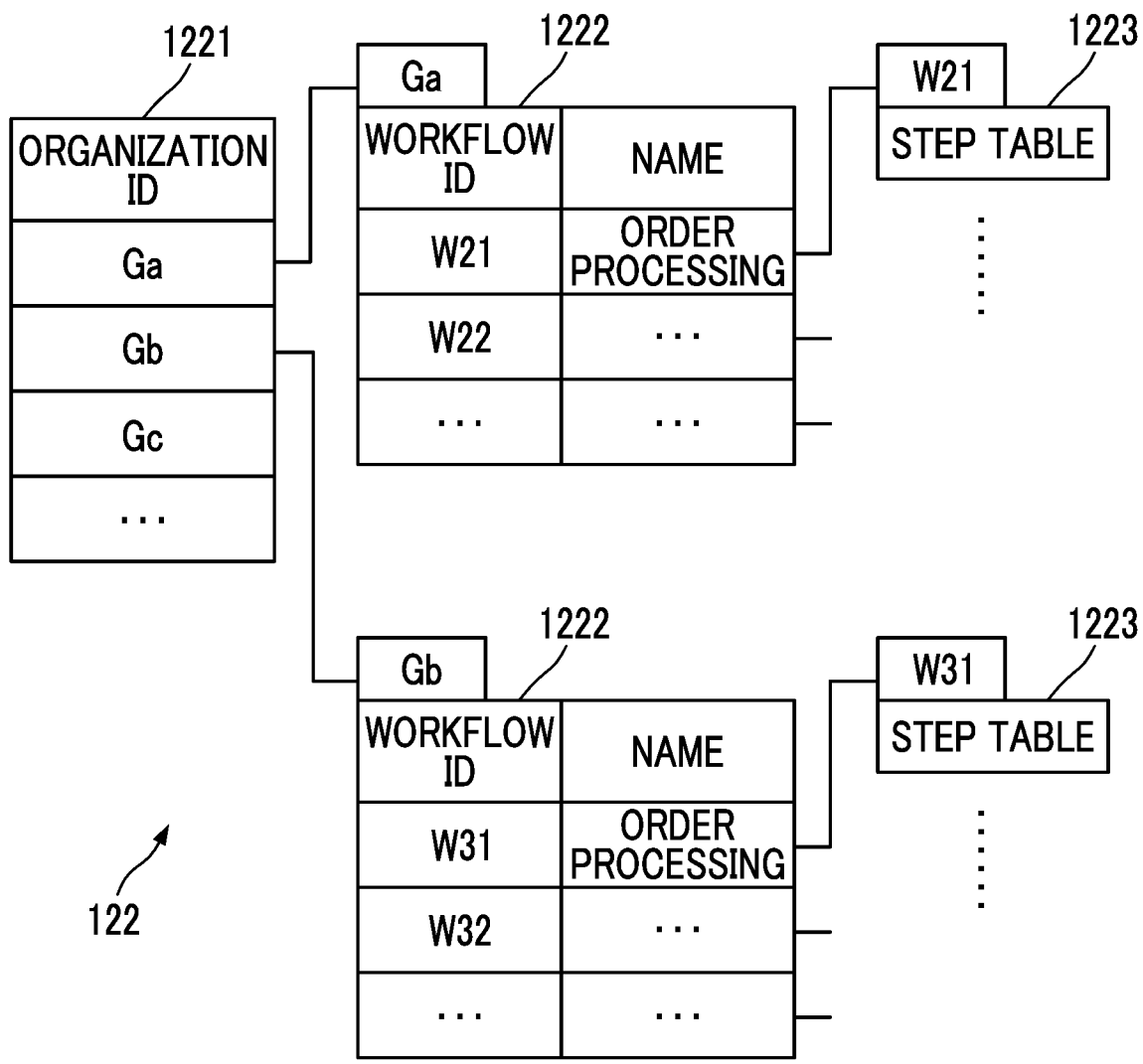
FIG. 4 is a diagram showing an example of a workflow DB 122.

FIG. 4 is a diagram showing an example of the workflow DB 122. The workflow DB 122 is a database that stores information on the workflow for each workflow handled by the information processing apparatus 1. Here, the workflow expresses a series of flows of information exchange performed in a case where a member belonging to the organization performs the task in the organization.

The workflow DB 122 shown in FIG. 4 includes an organization list 1221, a workflow table 1222, and a step table 1223. The organization list 1221 is a list in which organization IDs indicating organizations that use the information processing system 9 are listed. Each workflow table 1222 is associated with the organization ID included in the organization list 1221 one by one.

The workflow table 1222 is a table in which a workflow ID that is identification information for identifying the workflow used in the organization indicated by the associated organization ID is associated with a name of the workflow. Each step table 1223 is associated with the workflow ID included in the workflow table 1222 one by one.

The step table 1223 is a table in which information on a plurality of steps for configuring the workflow indicated by the associated workflow ID is described. FIGS. 5A and 5B are diagrams showing examples of the step table 1223. FIG. 5A shows content of the step table 1223 associated with a workflow ID "W21" in FIG. 4. Further, FIG. 5B shows content of the step table 1223 associated with a workflow ID "W31" in FIG. 4.

As shown in FIGS. 5A and 5B, in the step table 1223, a processing name, a manager ID, an input folder, and an output folder are associated with each step number indicating an implementation order of each step configuring the above-described workflow. According to processing content, the manager ID, the input folder, and the output folder may not be registered. The processing name is a name of processing performed in the step indicated by the corresponding step number. The manager ID is identification information on a user (hereinafter, referred to as a manager) who manages the above-described step among users of the information processing system 9. The input folder is identification information on a folder which is an area for storing information input for the processing performed in the above-described step. The output folder is identification information on a folder which is an area for storing information output by the processing performed in the above-described step. Note that, the input folder and the output folder are not limited to the folders, and may include, for example, input and output of a cloud service or the like, input using a scanner, or the like. As shown in FIGS. 5A and 5B, the input folder and the output folder, which are associated with one workflow ID and are described in the step table 1223, are not described in the step table 1223 associated with another workflow ID. As a result, in a case where the input folder or the output folder is specified, one workflow ID in which the input folder and the output folder are used is specified.

Configuration of Instruction DB

Figure 6:
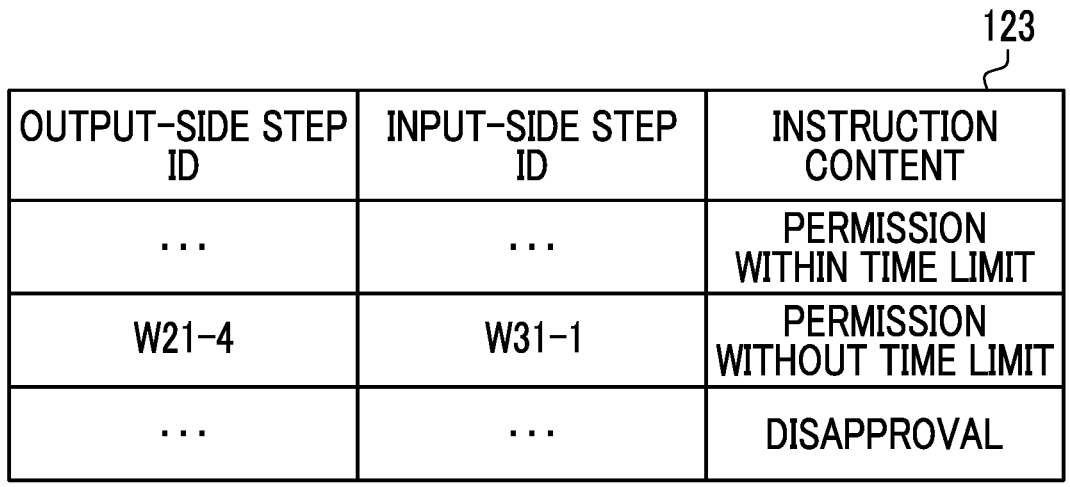
FIG. 6 is a diagram showing an example of an instruction DB 123.

FIG. 6 is a diagram showing an example of the instruction DB 123. The instruction DB 123 is a database that, in a case where the processor 11 detects two documents having common content in the document DB 124, stores content of instructions received from the respective managers of steps of inputting and outputting the documents.

The instruction DB 123 shown in FIG. 6 stores an output-side step ID, an input-side step ID, and the content of the instructions in association with each other.

The output-side step ID is identification information on a step associated with an output folder for storing a document whose storage date and time is old (hereinafter, referred to as a first document) in the two documents having the common content. Since the output-side step ID is identification information on a step of outputting the first document, the step identified by the output-side step ID is an example of a first step of outputting the first document. Hereinafter, the step identified by the output-side step ID is referred to as the first step.

The input-side step ID is identification information on a step associated with an input folder for storing a document (hereinafter, referred to as a second document) having content common to a document whose storage date and time is new in the above-described two documents, that is, the first document, and is stored later than the first document. Since the input-side step ID is identification information on a step of inputting the second document, the step identified by the input-side step ID is an example of a second step of inputting the second document. Hereinafter, the step identified by the input-side step ID is referred to as the second step.

The content of the instruction is the content of the instruction (hereinafter, referred to as a first instruction) each received from the manager who manages the first step and the manager who manages the second step, which is described above. The first instruction is an instruction as to whether or not to permit processing (hereinafter, referred to as first processing) of inputting the document output in the first step to the second step. The content of the instruction includes at least two types of permission and non-permission (that is, disapproval).

In the instruction DB 123 shown in FIG. 6, the content of the instruction includes three types of "permission within time limit", "permission without time limit", and "disapproval". The "permission within time limit" is the content of the instruction in which both the managers of the first step and the second step permit the first processing, and at least one of the managers designates the time limit. In a case where both of the two managers designate the time limit, the first processing is permitted until the time limit, which is early arrived, in the time limits. The manager can cause the information processing apparatus 1 to perform the first processing only in a case where the time limit is set for the permission of the first processing and thus, for example, it is assumed that there is a high relationship because a timing of implementation of a manual work that triggered discovery of the first processing is close. Note that, the time limit designated by the manager may be stored in the instruction DB 123 (not shown), or may be stored in a database or the like, which is different from the instruction DB 123, in association with each manager.

The "permission without time limit" is the content of the instruction in which both the managers of the first step and the second step permit the first processing without deciding the time limit. The "disapproval" is the content of the instruction in which at least one of the managers of the first step and the second step does not permit the first processing.

Configuration of Document DB

Figure 7:
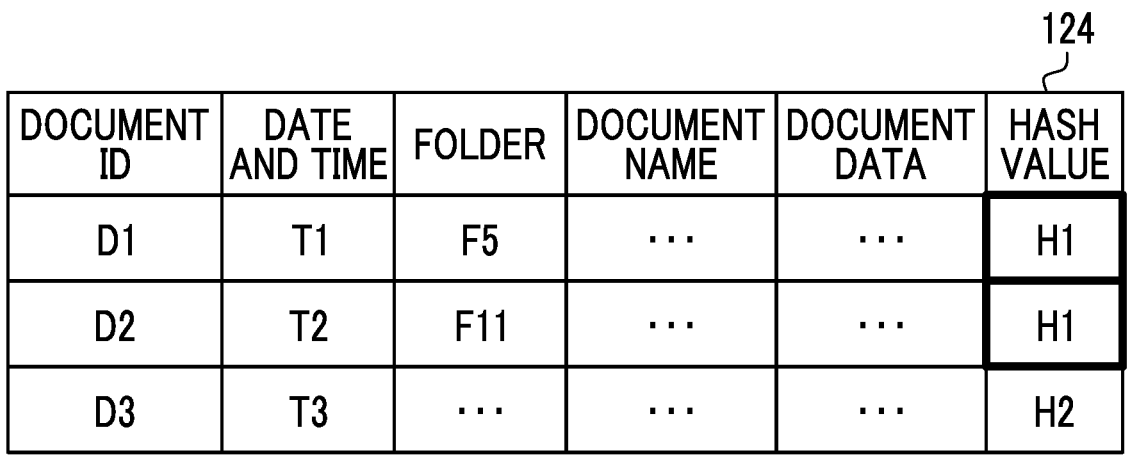
FIG. 7 is a diagram showing an example of a document DB 124.

FIG. 7 is a diagram showing an example of the document DB 124. The document DB 124 is a database that stores information on documents handled in the information processing system 9. The document DB 124 shown in FIG. 7 stores each document ID that is identification information for identifying the document in association with a date and time at which the document indicated by the document ID is stored, a folder in which the document is stored, a document name that is a name of the document, document data indicating content of the document, and a hash value calculated from the document data indicating the content of the document. The hash value is a numerical value obtained by applying a hash function to the document data. The hash function may be, for example, a cryptographic hash function, such as MD5 or SHA-1, or another function.

Configuration of Terminal

Figure 8:
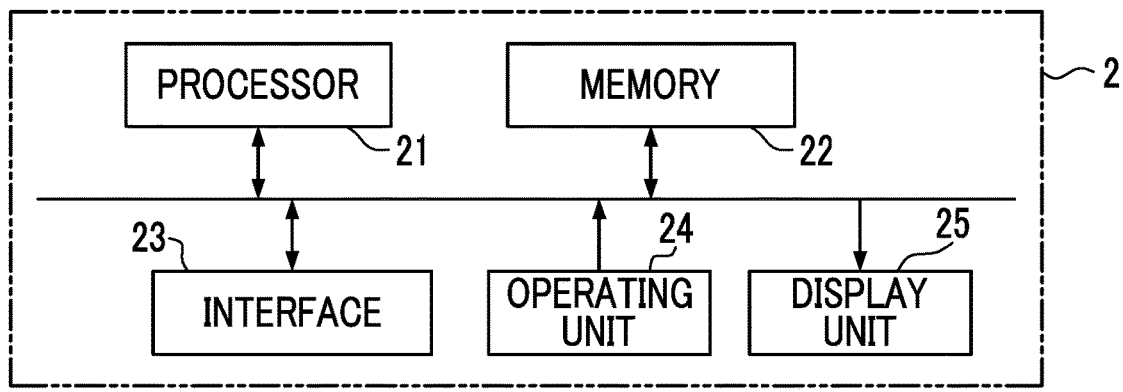
FIG. 8 is a diagram showing an example of a configuration of a terminal 2.

FIG. 8 is a diagram showing an example of a configuration of the terminal 2. The terminal 2 shown in FIG. 8 includes a processor 21, a memory 22, an interface 23, an operation unit 24, and a display unit 25. The components are connected by, for example, a bus to be communicable with each other.

The processor 21 controls each unit of the terminal 2 by reading and executing a program stored in the memory 22. The processor 21 is, for example, a CPU.

The memory 22 is a storage unit that stores an operating system read by the processor 21, various programs, data, and the like. The memory 22 includes a RAM and a ROM. Note that, the memory 22 may include a solid state drive, a hard disk drive, or the like.

The interface 23 is a communication circuit that connects the terminal 2 to the information processing apparatus 1 to be communicable via the second communication line 4 and the first communication line 3 in a wired or wireless manner.

The operation unit 24 includes operators, such as operation buttons, a keyboard, a touch panel, and a mouse, for giving various instructions, receives the operation, and sends a signal according to content of the operation to the processor 21. The operation is, for example, a press on the keyboard, a gesture on the touch panel, or the like.

The display unit 25 includes a display screen such as a liquid crystal display, and displays an image under the control of the processor 21. A transparent touch panel of the operation unit 24 may be arranged on the display screen in an overlapping manner.

Functional Configuration of Information Processing Apparatus

Figure 9:
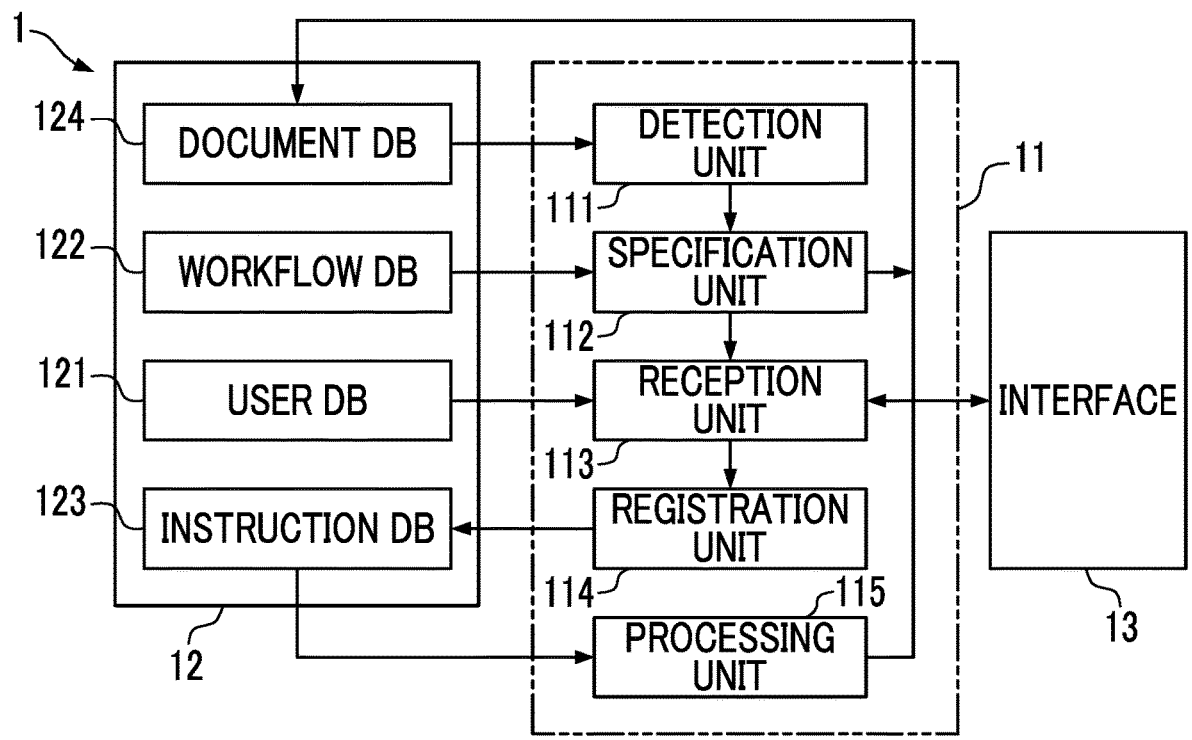
FIG. 9 is a diagram showing an example of a functional configuration of the information processing apparatus 1.

FIG. 9 is a diagram showing an example of a functional configuration of the information processing apparatus 1. The processor 11 of the information processing apparatus 1 functions as a detection unit 111, a specification unit 112, a reception unit 113, a registration unit 114, and a processing unit 115 by executing the program stored in the memory 12.

The detection unit 111 detects two documents having the common content among the plurality of documents stored in the document DB 124 of the memory 12. The detection unit 111 may detect the two documents by comparing, for example, the document data stored in the document DB 124. The detection unit 111 may detect the two documents by comparing the hash values stored in the document DB 124.

Further, the detection unit 111 specifies, in the two detected documents having the common content, the document whose stored date and time is old as the first document, and specifies the document whose stored date and time is new as the second document. That is, the processor 11 that functions as the detection unit 111 is an example of a processor which specifies the first document and the second document, which has content common to the first document and is stored later than the first document, among a plurality of documents.

The specification unit 112 refers to the workflow DB 122 and specifies the first step of outputting the first document detected by the detection unit 111 and the second step of inputting the detected second document, respectively. That is, the processor 11 that functions as the specification unit 112 is an example of a processor that specifies the first step of outputting the first document and the second step of inputting the second document.

In addition, the specification unit 112 refers to the workflow DB 122, and specifies a manager ID of the manager who manages the first step and a manager ID of the manager who manages the second step.

The reception unit 113 refers to the manager ID specified by the specification unit 112 and the user DB 121, and specifies the contact address of each of the managers who manage the first step and the second step. Further, the reception unit 113 requests the above-described first instruction to each contact address via the interface 13. The request is transmitted to the terminal 2 used by each manager via a mail, an instant message, or the like.

Each of the managers operates the operation unit 24 of the terminal 2 to respond to the transmitted request. As a result, the terminal 2 used by each manager transmits a signal indicating the first instruction to the information processing apparatus 1. The reception unit 113 receives the first instruction as response to the above-described request from each manager. That is, the processor 11 that functions as the reception unit 113 is an example of a processor that receives the first instruction as to whether or not permit the first processing of inputting the document, which is output from the first step, to the second step from each of the manager who manages the first step and the manager who manages the second step.

The registration unit 114 registers the content of the first instruction, which is received by the reception unit 113, in the instruction DB 123 in association with the first step and the second step.

The processing unit 115 performs the first processing in a case where any of the first steps associated with the first instruction, which is registered in the instruction DB 123 and indicates the permission, is performed. For example, in a case where the above-described first step is performed, the specification unit 112 specifies the output folder associated with the first step in the workflow DB 122.

Further, for example, in a case where the detection unit 111 detects a document newly stored in the specified output folder, the processing unit 115 copies the document in the input folder of the second step associated with the above-described first step in the instruction DB 123. With the operation, the above-described first processing is completed. That is, the processor 11 that functions as the processing unit 115 is an example of a processor that performs the first processing in a case where all the first instructions received from the managers of the first step and the second step permit the first processing.

Note that, in a case where the detection unit 111 detects the new document in the above-described output folder, the processing unit 115 may refer to the document from the above-described input folder. Since the document that can be referred to from the input folder is input to the second step using the input folder, the above-described first processing is also completed in this case. That is, in a case where the first processing is permitted according to the first instruction, the processing unit 115 may prepare a link of the document or may directly pass the data within the system, instead of copying the document. The link may be a hard link or a symbolic link. In addition, the processing unit 115 may directly input a result of the output to the second step by being triggered by the completion of the first step.

Operation of Information Processing Apparatus

Operation of Registering Content of Instruction

Figure 10:
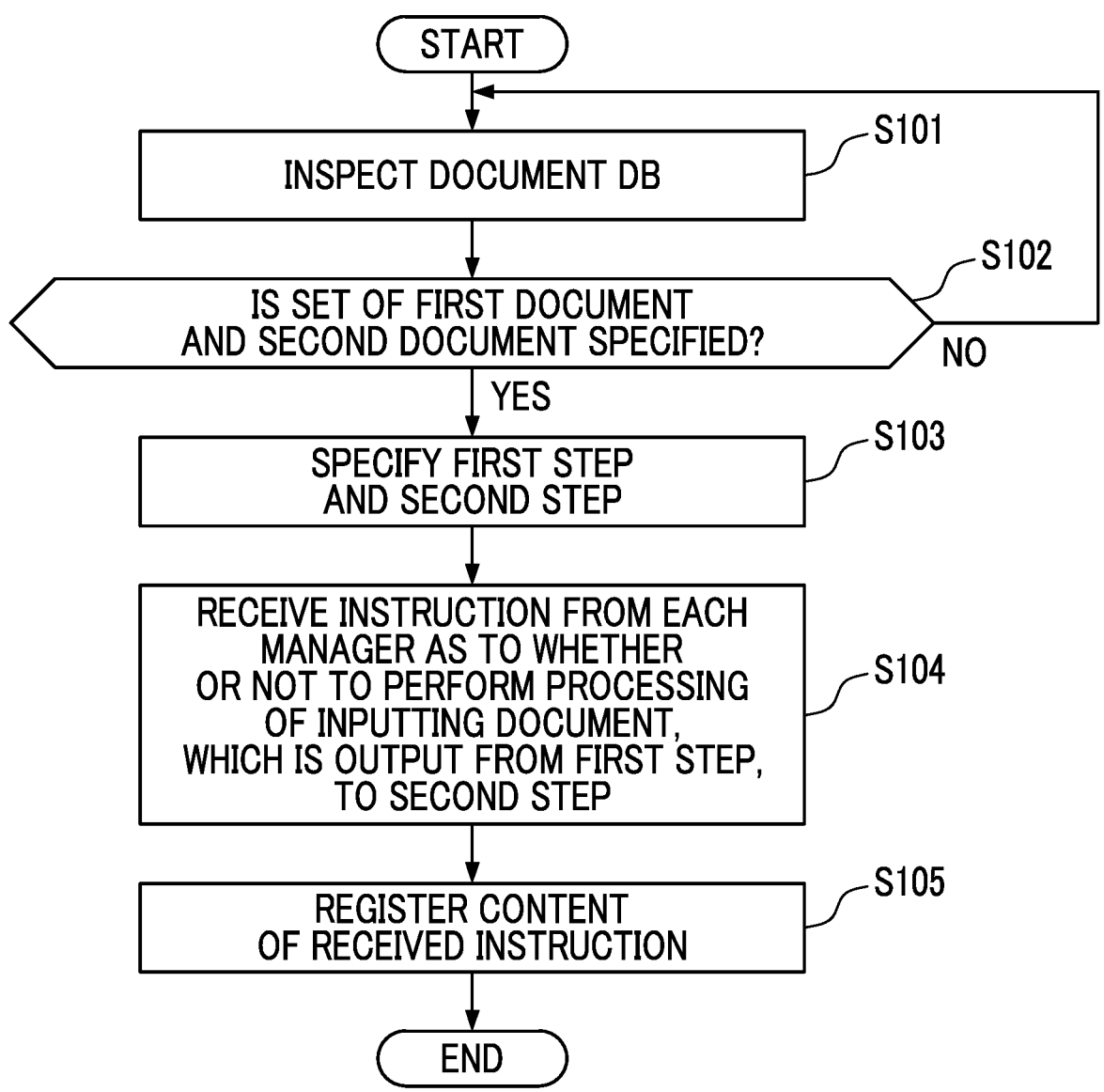
FIG. 10 is a flowchart showing an example of a flow of an operation of registering content of a first instruction by the information processing apparatus 1.

FIG. 10 is a flowchart showing an example of a flow of an operation of registering the content of the first instruction by the information processing apparatus 1. The processor 11 of the information processing apparatus 1 inspects the document DB 124 (step S101), and determines whether or not a set of the first document and the second document, which has the content common to the first document and is stored later than the first document, is specified (step S102).

In a case of determining that the set of the first document and the second document is not specified (step S102; NO), the processor 11 returns the processing to step S101. On the other hand, in a case of determining that the set of the first document and the second document is specified (step S102; YES), the processor 11 refers to the workflow DB 122, and specifies the first step of outputting the first document and the second step of inputting the second document (step S103).

For example, in the document DB 124 shown in FIG. 7, since both the hash values corresponding to a document ID "D1" and a document ID "D2" are "H1", the processor 11 which refers to the hash values determines that the documents identified by the two document IDs have content common to each other.

Further, in the document DB 124 shown in FIG. 7, a date and time at which the document identified by the document ID "D1" is stored is "T1", and a date and time at which the document identified by the document ID "D2" is stored is "T2". The processor 11 compares the dates and times, and specifies an older document as the first document and a newer document as the second document. Here, since T2 indicates a newer date and time than T1, the document identified by the document ID "D1" is specified as the first document, and the document identified by the document ID "D2" is specified as the second document.

As shown in FIG. 7, a folder in which the first document is stored is "F5", and a folder in which the second document is stored is "F11". As described above, the input folder and the output folder, which are described in the step table 1223 associated with one workflow ID, are not described in the step table 1223 associated with another workflow ID. Therefore, the processor 11 refers to the workflow DB 122 and specifies each of the first step of designating the folder "F5" as the output folder and the second step of designating the folder "F11" as the input folder.

In the example shown in FIG. 5A, the first step is a step corresponding to a step number "4" of the workflow ID "W21". In addition, in the example shown in FIG. 5B, the second step is a step corresponding to a step number "1" of the workflow ID "W31".

Hereinafter, it is assumed that each of the steps configuring the workflow is identified by an identification symbol in which the workflow ID and the step number are connected by a hyphen. In this case, an identification symbol of the first step is "W21-4". In addition, in this case, an identification symbol of the second step is "W31-1".

A reason that the first document and second document, which are described above, are specified is as follows. As shown in FIG. 4, a workflow identified by the workflow ID "W21" in the organization Ga is "order processing". The order processing is started first by a manager "U1" preparing an application form and storing the application form in a folder "F2" (step "W21-1"). The information processing apparatus 1 performs conversion processing, such as noise removal, on the application form and stores the application form obtained through the conversion in a folder "F3" (step "W21-2").

A manager "U2" who is a boss of the manager "U1" inspects the application form obtained through the conversion and stored in the folder "F3", stamps an approval mark, and stores the application form in a folder "F4" (step "W21-3"). A manager "U3" who belongs to a purchasing department prepares an order sheet based on the application form on which the approval mark is stamped, stores the order sheet in a folder "F5", and transmits a mail, to which the order sheet is attached, to a person in charge of the organization Gb which is an order destination (step "W21-4").

As shown in FIG. 4, the workflow identified by the workflow ID "W31" in the organization Gb is "order reception processing". The order reception processing is started in such a way that a manager "U4" stores the order sheet attached to the mail received from the organization Ga in a folder "F11", checks content of the order sheet, and, in a case where there is no problem, attaches a signature or the like to the order sheet, and stores the order sheet in a folder "F12" (step "W31-1").

A manager "U5" who is a boss of the manager "U4" inspects the order sheet, stamps the approval mark, and stores the order sheet in a folder "F13" (step "W31-2"). The manager "U4" performs delivery processing based on the order sheet to which the approval mark of the manager "U5" is stamped, prepares a delivery note, and stores the delivery note in a folder "F14" (step "W31-3").

Here, the manager "U3" of the organization Ga attaches a copy of the order sheet stored in the folder "F5" to the mail through the manual work, and transmits the copy to the manager "U4" of the organization Gb. The manager "U4" of the organization Gb stores the order sheet attached to the received mail in the folder "F11" through the manual work. That is, a reason that the first document and the second document having the common content are stored in the folder "F5" and the folder "F11", respectively, is that the manual works are performed.

Next, as shown in FIG. 10, as to whether or not to perform the first processing of inputting the document, which is output from the first step, to the second step, the processor 11 receives the first instructions from the managers who manage the respective steps (step S104). Further, the processor 11 registers the content of the received first instructions in the instruction DB 123 (step S105).

For example, as to whether or not to perform the first processing of inputting the document, which is output from the first step "W21-4", to a second step "W31-1", the processor 11 specifies the manager ID "U3" and the manager ID "U4", and requests the first instructions from the contact addresses of the managers identified by the manager IDs.

Further, in a case where both the first instructions received from the respective managers in response to the request are permission of the first processing without time limit, the processor 11 registers a record shown in FIG. 6 in the instruction DB 123 of the memory 12. The record is a record in which the first step "W21-4" is associated with the output-side step ID, the second step "W31-1" is associated with the input-side step ID, and the "permission without time limit" is associated with the permission content, respectively.

Operation of Performing Permitted Processing

Figures 11, 12:
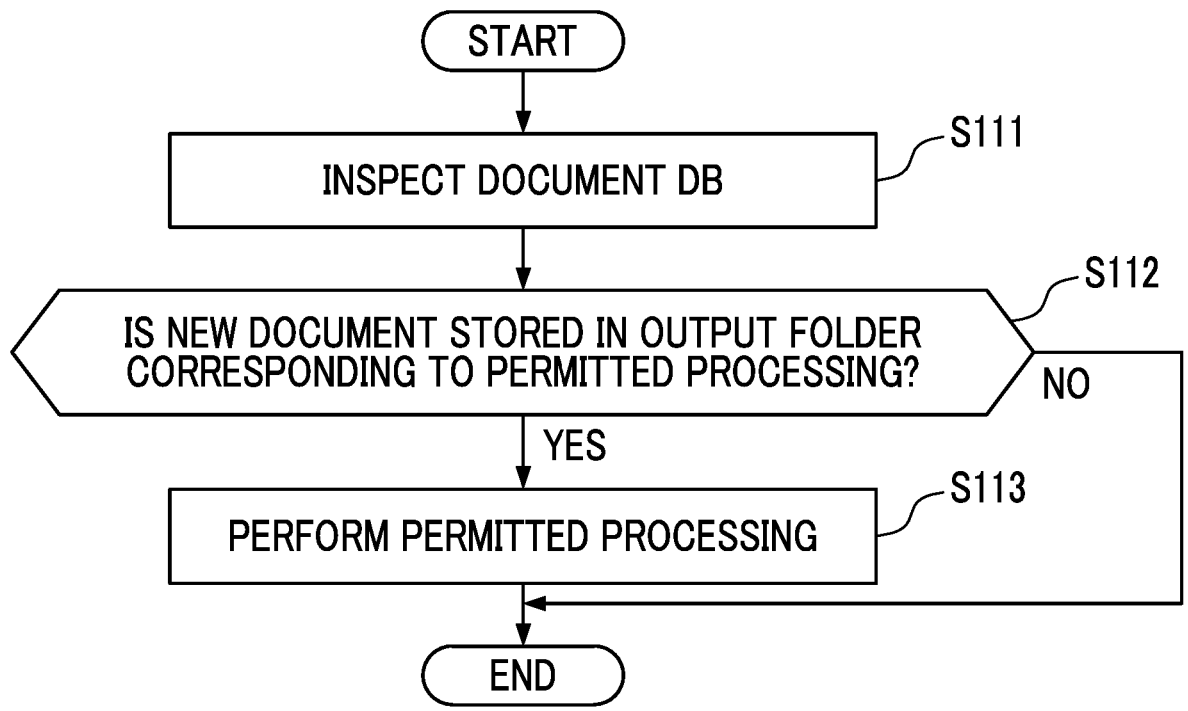
FIG. 11 is a flowchart showing an example of a flow of an operation of performing permitted first processing by the information processing apparatus 1.
FIG. 12 is a diagram showing an example of a result of the permitted first processing.

FIG. 11 is a flowchart showing an example of a flow of an operation of performing the permitted first processing by the information processing apparatus 1. The processor 11 of the information processing apparatus 1 inspects the document DB 124 (step S111), and determines whether or not a new document is stored in the output folder corresponding to the permitted first processing in the instruction DB 123 (step S112).

In a case of determining that no new document is stored in the above-described output folder (step S112; NO), the processor 11 ends the processing. On the other hand, in a case of determining that the new document is stored in the above-described output folder (step S112; YES), the processor 11 performs the above-described first processing (step S113).

For example, in a case where the new document identified as a document ID "D4" is stored in the folder "F5" at a date and time "T4" after the record shown in FIG. 6 is registered, the processor 11 detects the new document. Further, the processor 11 determines that the new document is a document output from the first step "W21-4" associated with the first processing permitted in the instruction DB 123. As a result, the processor 11 inputs the new document in the second step "W31-1" associated with the above-described first processing. For example, the processor 11 prepares a link of the new document in the folder "F11" which is an input folder of the second step "W31-1".

FIG. 12 is a diagram showing an example of a result of the permitted first processing. The link of the new document identified by the above-described document ID "D4" is realized by preparing a document, in which the document ID "D4" is described in the document data, in the folder "F11". A document ID "D5" is given to the prepared document. Further, in the document DB 124, the document ID "D5" is associated with each of a prepared date and time "T5", the folder "F11", and the document name.

Hereinabove, the information processing apparatus 1 inspects the document stored by the manager of each of the steps of the workflow by performing the described operation. Further, in a case where two documents, which have common content, are sequentially stored, the information processing apparatus 1 receives an instruction from each of the managers in a case of performing processing on behalf of a document, which is handled on the next time, between the steps of inputting and outputting the documents. Further, in a case where permission is obtained from both the managers, the information processing apparatus 1 performs the permitted processing. As a result, the information processing apparatus 1 of the information processing system 9 finds the manual work that naturally occurs in the workflow, and performs on behalf of the processing by obtaining the permission from the manager who performs the manual work. Therefore, the manual work that is not noticed by the manager of the step can be reduced, and thus the workflow is easily interworked. In addition, since the information processing apparatus 1 performs on behalf of the processing through the manual work after the permission of the manager, there is no case where the processing which is not permitted by the manager is performed.

Modification Example

Although the exemplary embodiment is described above, the content of the exemplary embodiment may be modified as below. In addition, modification examples below may be combined.

<1>

In the above-described exemplary embodiment, as to whether or not to perform the first processing of inputting the document, which is output from the first step, to the second step, the processor 11 of the information processing apparatus 1 receives the first instructions from the managers who manage the respective steps. However, the received instructions are not limited thereto. For example, as to whether or not to perform second processing of inputting a document, which is output from a third step different from the first step, to the second step, the processor 11 may receive instructions from respective managers. The third step is a step which has the content common to the first step and which has a different manager.

Here, whether or not the content of the steps is common is determined by, for example, processing names of the steps, a condition of the processing, a condition of branch, a template of a document to be input and output, a functional name of a program used by the processor 11 of the information processing apparatus 1 in the step, identification information on dialog, and the like.

Figure 13:
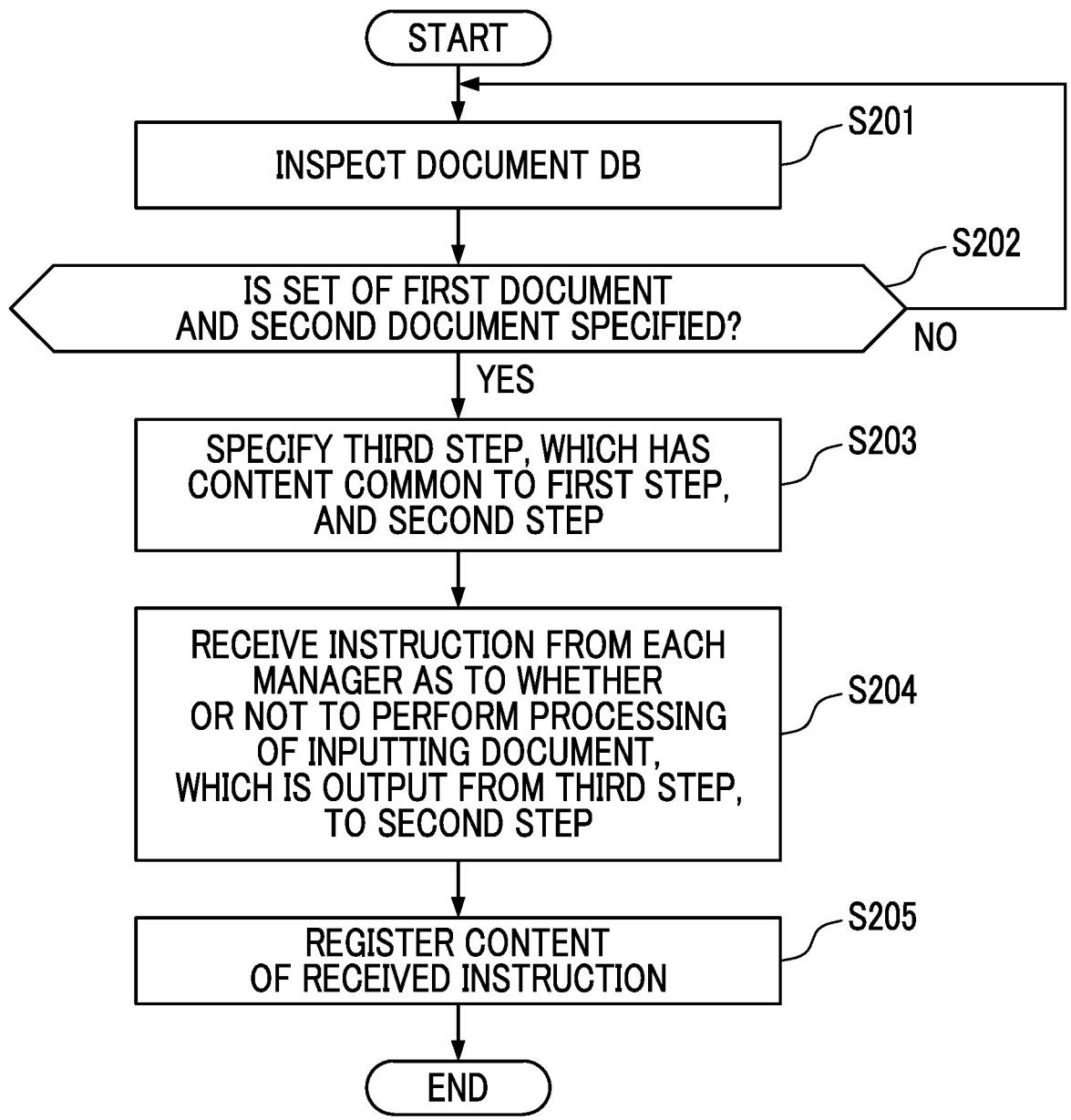
FIG. 13 is a flowchart showing an example of a flow of an operation of registering content of an instruction according to a modification example.

FIG. 13 is a flowchart showing an example of a flow of an operation of registering content of an instruction according to the modification example. The processor 11 of the information processing apparatus 1 inspects the document DB 124 (step S201) and determines whether or not the above-described set of the first document and the second document is specified (step S202).

In a case of determining that the set of the first document and the second document is not specified (step S202; NO), the processor 11 returns the processing to step S201. On the other hand, in a case of determining that the set of the first document and the second document is specified (step S202; YES), the processor 11 refers to the workflow DB 122 and specifies the third step and the second step of inputting the second document (step S203). Here, the third step is a step which has the content common to the first step of inputting the first document and has a different manager. That is, the processor 11 is an example of a processor that specifies the third step which has the content common to the first step and has the different manager from the first step.

Further, as to whether or not to perform the second processing of inputting the document, which is output from the third step, to the second step, the processor 11 receives second instructions from managers who manage the respective steps (step S204). That is, the processor 11 is an example of a processor that receives the second instructions from the manager who manages the second step and the manager who manages the third step as to whether or not to permit the second processing of inputting the document, which is output from the third step, to the second step. Further, the processor 11 registers the content of the received second instructions in the instruction DB 123 (step S205).

FIG. 14 is a diagram showing an example of the workflow DB 122 according to the modification example. FIG. 14 shows the step table 1223 associated with the workflow ID "W41" in the workflow DB 122. A step "W41-4" having content common to the step "W21-4" shown in FIG. 5A in a point that the processing name is "order sheet preparation". Further, a manager ID "U13" corresponding to the step "W41-4" shown in FIG. 14 is different from the manager ID "U3" corresponding to the step "W21-4" shown in FIG. 5A. Therefore, the step "W41-4" is the third step having the content common to the step "W21-4" which is the first step and having the different manager.

The processor 11 obtains instructions from the manager "U13" and the manager "U4" as to whether or not to perform the second processing of inputting the document output from the step "W41-4", which is the third step, to the step "W31-1", which is the second step, and registers content of the received instructions. Further, in a case of receiving the instructions to permit the above-described second processing from both the managers, the processor 11 performs the second processing. That is, the processor 11 is an example of a processor that performs the second processing in a case where both the received second instructions permit the second processing.

FIG. 15 is a diagram showing an example of the instruction DB 123 according to the modification example. For example, in the case where the instructions to give permission as to whether or not to perform the second processing from the above-described manager "U13" and the manager "U4" and at least one of the instructions instructs to give permission with time limit, the processor 11 registers a record shown in FIG. 15 in the instruction DB 123 of the memory 12. The record is a record in which the output-side step ID is associated with the third step "W41-4", the input-side step ID is associated with the second step "W31-1", and the permission content is associated with "permission within time limit".

FIG. 16 is a diagram showing an example of a result of the permitted second processing. For example, in a case where, after the record shown in FIG. 15 is registered, a new document identified by a document ID "D7" is stored in a folder "F25" at a date and time "T7", the processor 11 detects the new document, and determines that the new document is a document output from a third step "W31-4" associated with the permitted second processing in the instruction DB 123.

Further, the processor 11 inputs the new document to the second step "W31-1" associated with the above-described second processing. For example, the processor 11 prepares a link of the new document in the folder "F11" which is an input folder of the second step "W31-1".

As a result, as shown in FIG. 16, a new record, to which a document ID "D8" is given, is added to the document DB 124. The added record includes a prepared date and time "T8" and the folder "F11", and, in addition, the document ID "D7" of the document that is a link source is described in the document data.

For example, in a case where the third step having common content is newly provided by using the first step as a template, there is a possibility that a manual work generated in a path from the first step to the second step is generated in a path from the third step to the second step. With the configuration, the generation of the manual work in the newly provided third step is suppressed based on an example of the manual work generated in the first step having content common to the third step.

<2>

In the above-described exemplary embodiment, the instructions received by the processor 11 of the information processing apparatus 1 are not limited to the above description. For example, as to whether or not to perform the third processing of inputting the document, which is output from the first step, to a fourth step which is different from the second step, the processor 11 may receive instructions from the respective managers. The fourth step is a step which has content common to the second step and has a different manager.

Figure 17:
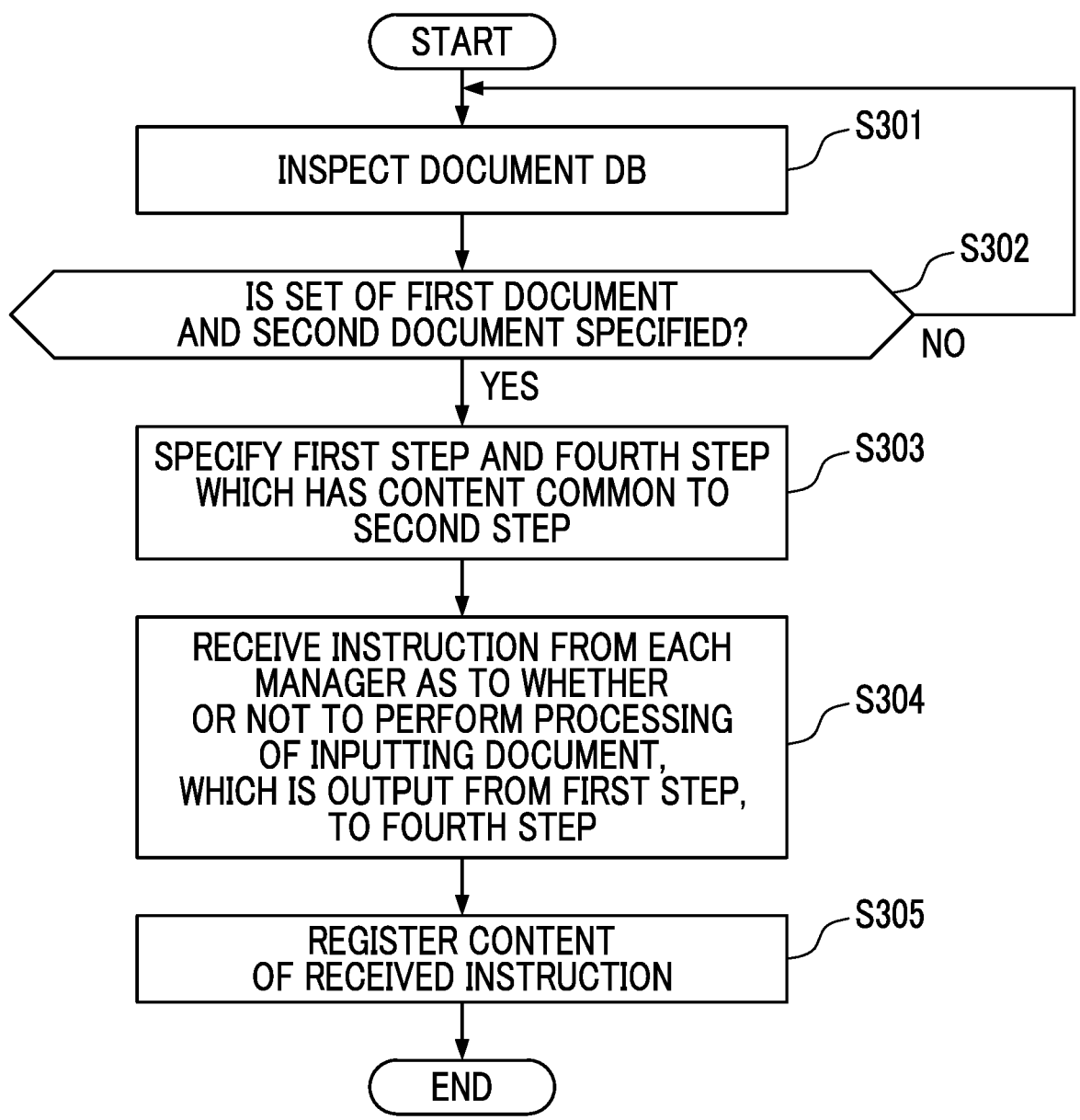
FIG. 17 is a flowchart showing an example of a flow of an operation of registering the content of the instruction according to the modification example.

FIG. 17 is a flowchart showing the example of the flow of the operation of registering the content of the instruction according to the modification example. The processor 11 of the information processing apparatus 1 inspects the document DB 124 (step S301) and determines whether or not the above-described set of the first document and the second document is specified (step S302).

In a case of determining that the set of the first document and the second document is not specified (step S302; NO), the processor 11 returns the processing to step S301. On the other hand, in a case of determining that the set of the first document and the second document is specified (step S302; YES), the processor 11 refers to the workflow DB 122, and specifies the first step of inputting the first document and the fourth step (step S303). Here, the fourth step is a step that has content common to the second step of inputting the second document and has a different manager. That is, the processor 11 is an example of a processor that specifies the fourth step that has content common to the second step and has a different manager from the second step.

Further, as to whether or not to perform the third processing of inputting the document, which is output from the first step, to the fourth step, the processor 11 receives third instructions from the managers who manage the steps, respectively (step S304). That is, the processor 11 is an example of a processor that receives the third instructions from the manager who manages the first step and the manager who manages the fourth step as to whether or not to permit the third processing of inputting the document, which is output from the first step, to the fourth step. Further, the processor 11 registers content of the received third instructions in the instruction DB 123 (step S305).

FIG. 18 is a diagram showing an example of the workflow DB 122 according to the modification example. FIG. 18 shows a step table 1223 associated with a workflow ID "W42" in the workflow DB 122. A step "W42-1" has content common to the step "W31-1" shown in FIG. 5B in a point that the processing name is "order sheet check". Further, a manager ID "U24" corresponding to the step "W42-1" shown in FIG. 18 is different from the manager ID "U4" corresponding to the step "W31-1" shown in FIG. 5B. Therefore, the step "W42-1" is the fourth step which has content common to the step "W31-1" that is the second step and which has a different manager.

The processor 11 obtains instructions from the manager "U3" and the manager "U24" as to whether or not to perform the third processing of inputting the document, which is output from the step "W21-4" that is the first step, to the step "W42-1" that is the fourth step, and registers content of the received instructions. Further, in a case of receiving instructions to permit the above-described third processing from both the managers, the processor 11 performs the third processing. That is, the processor 11 is an example of a processor that performs the third processing in a case where both the received third instructions permit the third processing.

FIG. 19 is a diagram showing an example of a result of the permitted third processing. In a case where, after the above-described third processing is permitted and the instruction DB 123 is updated, a new document identified by, for example, a document ID "D10" is stored in the folder "F5" at a date and time "T10" as shown in FIG. 19, the processor 11 detects the new document. Further, the processor 11 determines that the new document is a document output from the first step "W21-4" associated with the permitted third processing.

Further, the processor 11 inputs the new document to the fourth step "W42-1" associated with the above-described third processing. For example, the processor 11 prepares a link of the new document in an input folder "F31" of the fourth step "W42-1".

As a result, as shown in FIG. 19, a new record, to which a document ID "D11" is given, is added to the document DB 124. The added record includes a prepared date and time "T11" and a folder "F31", and the document ID "D10" of the document that is a link source is described in the document data.

For example, in a case where the fourth step having common content is newly provided by using the second step as a template, there is a possibility that a manual work generated in a path from the first step to the second step is generated in a path from the first step to the fourth step. With the configuration, the generation of the manual work in the newly provided fourth step is suppressed based on the example of the manual work generated in the second step having content common to the fourth step.

<3>

In the above-described exemplary embodiment, although the processor 11 of the information processing apparatus 1 performs the processing of inputting the document, which is output from the first step, to another step in a case where permission is given from the managers, the processor 11 may impose a condition with respect to a document to be processed. For example, the processor 11 may perform a process of inputting only a document having a feature of the first document to another step among the documents output from the first step.

FIG. 20 is a flowchart showing an example of a flow of an operation of registering content of an instruction according to the modification example. The processor 11 of the information processing apparatus 1 inspects the document DB 124 (step S401) and determines whether or not the above-described set of the first document and the second document is specified (step S402).

In a case of determining that the set of the first document and the second document is not specified (step S402; NO), the processor 11 returns the processing to step S401. On the other hand, in a case of determining that the set of the first document and the second document is specified (step S402; YES), the processor 11 refers to the workflow DB 122, and specifies the first step of inputting the first document and the second step of inputting the second document (step S403).

In addition, the processor 11 specifies the feature of the first document (step S404). The feature of the first document is specified by, for example, a text string described in the first document, a position of a ruled line, a title, a signature, a seal, or the like. The feature of the first document includes, for example, a fact that an organization name which is determined as a destination is described, a fact that a determined title, a signature, a seal, or the like is included, a fact that the transaction amount is equal to or larger than or less than the determined amount, a fact that a product determined as a transaction item exists, and the like. That is, the processor 11 is an example of a processor that specifies the feature of the first document. Note that, in a case where the first document is stored as the image data indicating an image, the processor 11 may specify the above-described feature by analyzing the image indicating the first document.

Next, the processor 11 receives instructions from the managers who manage the respective steps as to whether or not to perform the processing of inputting the document, which has the feature of the first document, to the second step among the documents which are output from the first step (step S405).

Further, the processor 11 registers the content of the received instructions in the instruction DB 123 (step S406). That is, the processing, in which the processor 11 obtains the instructions from the respective managers, is an example of the first processing of inputting the document, which has the feature of the specified first document, to the second step among the documents which are output from the first step.

According to the configuration, for example, among the documents which are output from the first step that has the processing name of order sheet preparation, only the document having the feature "a name of the organization Gb is described in a destination field" is input to the second step that has the processing name of order sheet check by the information processing apparatus 1.

<4>

In the above-described modification example, although the processor 11 of the information processing apparatus 1 performs the second processing of inputting the document, which has content common to the first step and is output from the third step that has a different manager, to the second step in the case where permission is given from the managers, the processor 11 may impose a condition with respect to the document to be processed. For example, the processor 11 may perform processing of inputting only the document, which has the feature of the first document, to the second step among the documents output from the third step. In other words, the processing, in which the processor 11 obtains the instructions from the respective managers, is an example of the second processing of inputting the document, which has the feature of the specified first document, to the second step among the documents which are output from the third step.

According to the configuration, for example, among the documents which are common to the first step in a point that the processing name is "order sheet preparation" and are output from the third step that has a different manager, only a document which has a feature that "a name of the organization Gb is described in the destination field" is input to the second step, which has the processing name of the order sheet check, by the information processing apparatus 1.

<5>

In the above-described modification example, although the processor 11 of the information processing apparatus 1 performs the third processing of inputting the document, which is output from the first step, to the fourth step, which has content common to the second step and has a different manager, in the case where permission is given from the managers, a condition may be imposed on the document to be processed. For example, the processor 11 may perform processing of inputting only the document, which has the feature of the first document, to the fourth step among the documents which are output from the first step. That is, the processing, in which the processor 11 obtains the instructions from the respective managers, is an example of the third processing of inputting the document, which has the feature of the specified first document, to the fourth step among the documents output from the first step.

According to the configuration, for example, among the documents output from the first step, only the document, which has the feature that "the name of the organization Ga is described in a transmission field", is input to the fourth step, which is common to the second step in a point that the processing name is "order sheet check" and has a different manager, by the information processing apparatus 1.

<6>

In the above-described exemplary embodiment, although the document DB 124 stores the hash values calculated from the document data, the document DB 124 may not store the hash values. In this case, whenever the processor 11 specifies two documents having common content from the document DB 124, the hash values may be calculated from the document data.

In addition, the processor 11 may calculate the hash values from the document data at a determined timing. For example, although the processor 11 may calculate the hash values at a timing in which the document data is stored in the document DB 124, the processor 11 may also calculate the hash values at a time, such as one o'clock at night, which is designated in advance. In addition, the processor 11 may measure the amount of processing load on the processor 11, and may calculate the above-described hash values in a case where the amount of load is less than a threshold value. In this case, the processor 11 may store a symbol indicating that calculation is being prepared in a hash value field of the document DB 124 until the hash values are calculated.

<7>

In the above-described exemplary embodiment, the input folder and the output folder described in the step table 1223 associated with one workflow ID in the workflow DB 122 are not described in the step table 1223 associated with another workflow ID. However, identification information on a common folder may be described in each of two or more step tables 1223 associated with different workflow IDs, respectively. In this case, for example, the document DB 124 may store the workflow ID indicating a workflow to which the document that is associated with the document ID and is identified by the document ID is input or output. As a result, in a case where a set of the document ID and the input folder or a set of the document ID and the output folder is specified, the information processing apparatus 1 specifies the workflow ID and the step number used to store the document identified by the document ID in the input folder or the output folder.

<8>

Although the above-described information processing apparatus 1 includes the processor 11 configured with the CPU, a control unit which controls the information processing apparatus 1 may have another configuration. For example, the information processing apparatus 1 may include various processors in addition to the CPU.

Here, the term "processor" refers to hardware in a broad sense. Examples of the processor include general processors (e.g., CPU: Central Processing Unit) or dedicated processors (e.g., GPU: Graphics Processing Unit, ASIC: Application Integrated Circuit, FPGA: Field Programmable Gate Array, and programmable logic device).

<9>

In the embodiments above, the term "processor" is broad enough to encompass one processor or plural processors in collaboration which are located physically apart from each other but may work cooperatively. For example, the processor 11 of one information processing apparatus 1 belonging to the cloud C may perform the above-described operation in cooperation with a processor 11 of another information processing apparatus 1 belonging to the cloud C. In addition, for example, the above-described processor 21 of the terminal 2 may also have at least a part of the functions of the above-described processor 11.

In addition, the order of operations of the processor is not limited to one described in the embodiments above, and may be changed.

<10>

The above-described program executed by the processor 11 of the information processing apparatus 1 is an example of a program causing a computer, which includes a memory that stores each of a plurality of documents and a processor, to execute a step of specifying a first document and a second document, which has content common to the first document and is stored later than the first document, among a plurality of documents, a step of specifying a first step of outputting a first document and a second step of inputting the second document, a step of receiving, from a manager who manages the first step and a manager who manages the second step, first instructions as to whether or not to permit first processing of inputting a document, which is output from the first step, to the second step, and a step of performing the first processing in a case where both the received first instructions permit the first processing.

The programs may be provided in a state of being stored in a computer-readable recording medium including a magnetic recording medium, such as a magnetic tape and a magnetic disk, an optical recording medium such as an optical disk, a magneto-optical recording medium, a semiconductor memory, and the like. In addition, the program may be downloaded via a communication line such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a memory that stores each of a plurality of documents; and
a processor configured to
inspect a document database in the memory, and determine whether or not a set of a first document and a second document which has content common to the first document and is stored later than the first document among the plurality of documents is specified,
specify a first step of outputting the first document and a second step of inputting the second document in a case of determining that the set of the first document and the second document is specified,
receive, from a manager who manages the first step of outputting the first document and a manager who manages the second step of inputting the second document, first instructions as to whether or not to permit first processing of inputting a document, which is output from the first step, to the second step, and
perform the first processing in a case where both the received first instructions permit the first processing.

2. The information processing apparatus according to claim 1,
wherein the processor is configured to
specify a third step which has content common to the first step and has a different manager from the first step,
receive, from the manager who manages the second step and a manager who manages the third step, second instructions as to whether or not to permit second processing of inputting a document, which is output from the third step, to the second step, and
perform the second processing in a case where both the received second instructions permit the second processing.

3. The information processing apparatus according to claim 2,
wherein the processor is configured to
specify a fourth step which has content common to the second step and has a different manager from the second step,
receive, from the manager who manages the first step and a manager who manages the fourth step, third instructions as to whether or not to permit third processing of inputting the document, which is output from the first step, to the fourth step, and
perform the third processing in a case where both the received third instructions permit the third processing.

4. The information processing apparatus according to claim 3,
wherein the processor is configured to specify a feature of the first document, and
wherein the third processing is processing of inputting a document, which has the feature, among the documents which are output from the first step, to the fourth step.

5. The information processing apparatus according to claim 2,
wherein the processor is configured to specify a feature of the first document, and wherein the second processing is processing of inputting a document, which has the feature, among the documents which are output from the third step, to the second step.

6. The information processing apparatus according to claim 1,
wherein the processor is configured to
specify a fourth step which has content common to the second step and has a different manager from the second step,
receive, from the manager who manages the first step and a manager who manages the fourth step, third instructions as to whether or not to permit third processing of inputting the document, which is output from the first step, to the fourth step, and
perform the third processing in a case where both the received third instructions permit the third processing.

7. The information processing apparatus according to claim 6,
wherein the processor is configured to specify a feature of the first document, and
wherein the third processing is processing of inputting a document, which has the feature, among the documents which are output from the first step, to the fourth step.

8. The information processing apparatus according to claim 1,
wherein the processor is configured to specify a feature of the first document, and
wherein the first processing is processing of inputting a document, which has the feature, among the documents which are output from the first step, to the second step.

9. A non-transitory computer readable medium storing a program causing a computer including a memory that stores each of a plurality of documents, and a processor, to execute a process, the process comprising:
inspecting a document database in the memory, and determining whether or not a set of a first document and a second document which has content common to the first document and is stored later than the first document among the plurality of documents, is specified,
specifying a first step of outputting the first document and a second step of inputting the second document in a case of determining that the set of the first document and the second document is specified,
receiving, from a manager who manages the first step of outputting the first document and a manager who manages the second step of inputting the second document, first instructions as to whether or not to permit first processing of inputting a document, which is output from the first step, to the second step, and
performing the first processing in a case where both the received first instructions permit the first processing.

* * * * *